United States Patent [19]
Dickson

[11] Patent Number: 5,526,144
[45] Date of Patent: Jun. 11, 1996

[54] OPTICAL SYSTEM WITH PIVOTING HOLOGRAM

[75] Inventor: Leroy D. Dickson, Morgan Hill, Calif.

[73] Assignee: International Business Machines Corporation, Armonk, N.Y.

[21] Appl. No.: 154,889

[22] Filed: Nov. 18, 1993

[51] Int. Cl.[6] .................................... G02B 5/32
[52] U.S. Cl. .................. 359/15; 359/1; 359/17; 369/44.21
[58] Field of Search .................... 359/1, 15, 16, 359/18, 209, 225; 369/44.11, 44.21, 44.17, 44.19

[56] References Cited

U.S. PATENT DOCUMENTS

| | | | |
|---|---|---|---|
| 4,466,088 | 8/1984 | Trethewey | 369/46 |
| 4,564,757 | 1/1986 | LaBudde et al. | 250/239 |
| 4,583,816 | 4/1986 | Kramer | 359/16 |
| 4,744,071 | 5/1988 | Bricot et al. | 369/44 |
| 4,776,652 | 10/1988 | Ih | 359/16 |
| 4,782,474 | 11/1988 | Arai et al. | 369/44 |
| 4,930,868 | 6/1990 | Gerlitz | 359/15 |
| 4,969,137 | 11/1990 | Sugiyama et al. | 369/32 |
| 5,060,213 | 10/1991 | Kamisada | 369/44.21 |
| 5,202,868 | 4/1993 | Terao et al. | 369/44.17 |
| 5,253,245 | 10/1993 | Rabedeau | 369/119 |

FOREIGN PATENT DOCUMENTS

| | | | |
|---|---|---|---|
| 56-83850 | 7/1981 | Japan | G11B 7/12 |
| 0221662 | 2/1990 | Japan | G11B 7/09 |

*Primary Examiner*—Martin Lerner
*Assistant Examiner*—Darren E. Schuberg
*Attorney, Agent, or Firm*—Douglas R. Millett

[57] ABSTRACT

An optical data storage system includes a pivotally mounted hologram. Rotation of the hologram results in beam displacement at the optical medium for purposes of fine tracking. The hologram is designed and positioned relative to the focusing lens, such that the beam always passes through the center aperture of the lens even when the beam is displaced at the optical medium. Thus, the beam is not truncated at the focusing lens and loss of light and aberration problems are prevented.

33 Claims, 4 Drawing Sheets

OPTICAL SYSTEM WITH PIVOTING HOLOGRAM

BACKGROUND OF THE INVENTION

1. Field of the Invention

This invention relates generally to optical systems and more particularly to an optical system which uses a pivoting hologram to adjust beam position.

2. Description of the Prior Art

Optical data storage systems typically have an optical data storage disk medium which stores data on concentric or spiral tracks. A fixed optical system (FOS) contains a laser for generating a laser beam to be directed to the disk and sensors for detecting reflected light from the disk. The data is accessed by positioning a movable optical head to a position proximate the desired track. The head is moved by a radial linear motor, otherwise known as a coarse tracking actuator.

The optical head typically contains a rotatable mirror for directing the laser from the FOS to the disk and an objective lens for focusing the beam to the disk. The objective lens is attached to a focus actuator which moves the lens in order to keep the beam properly focused on the disk. A fine tracking actuator in the optical disk moves the rotatable mirror such that the beam of light always remains exactly on the desired track. Examples of these types of optical systems include U.S. Pat. No. 4,466,088, issued Aug. 14, 1984, to Trethewey; U.S. Pat. No. 4,564,757, issued Jan. 14, 1986, to Labudde et al; U.S. Pat. No. 4,744,071, issued May 10, 1988, to Bricot et al; U.S. Pat. No. 4,969,137, issued Nov. 6, 1990, to Sugiyama et al; Japanese Patent Application JP56-83850, published Jul. 8, 1981, by Nagashima et al; and Japanese Patent Application JP02-216625, published Aug. 29, 1990, by Maeda et al.

In each of these systems, the mirror is rotated such that the beam is displaced and fine tracking on the data track is achieved. A problem with these schemes is that the aperture of the objective lens in the optical head is relatively small and the beam displacements caused by the rotatable mirror cause a large fraction of the beam to miss the aperture of the objective lens. This causes a large variation in the strength of the data signal which can result in misreading of the data. Also, as the beam moves away from the center aperture, beam distortions and aberrations may occur.

U.S. Pat. No. 4,782,474, issued Nov. 1, 1988, to Arai et al shows one possible solution to this problem. Here the objective lens is mounted to an additional actuator which moves the lens laterally as the rotatable mirror displaces the beam. By coordinating the movement of the mirror and the lens, the beam will always pass through the center of the lens. The problem with this scheme is that it adds additional components, circuitry, complexity and cost to the system.

What is needed is a simple and inexpensive way to achieve fine tracking without displacing the beam from the lens aperture.

SUMMARY OF THE INVENTION

Briefly, in a preferred embodiment, the present invention comprises an optical data storage system having an optical data storage medium. An electromagnetic source produces an electromagnetic beam. A pivotally mounted hologram diffracts the electromagnetic beam. An objective lens receives the beam from the hologram and focuses it to a spot on the medium. The spot on the medium is displaced by rotating the hologram over an angle of rotation. The hologram is designed and oriented such that throughout the range of rotation of the hologram, the electromagnetic beam always passes through the center aperture of the lens.

For a fuller understanding of the nature and advantages of the present invention, reference should be made to the following detailed description taken in conjunction with the accompanying drawings.

DESCRIPTION OF THE PREFERRED EMBODIMENTS

Figure 1:
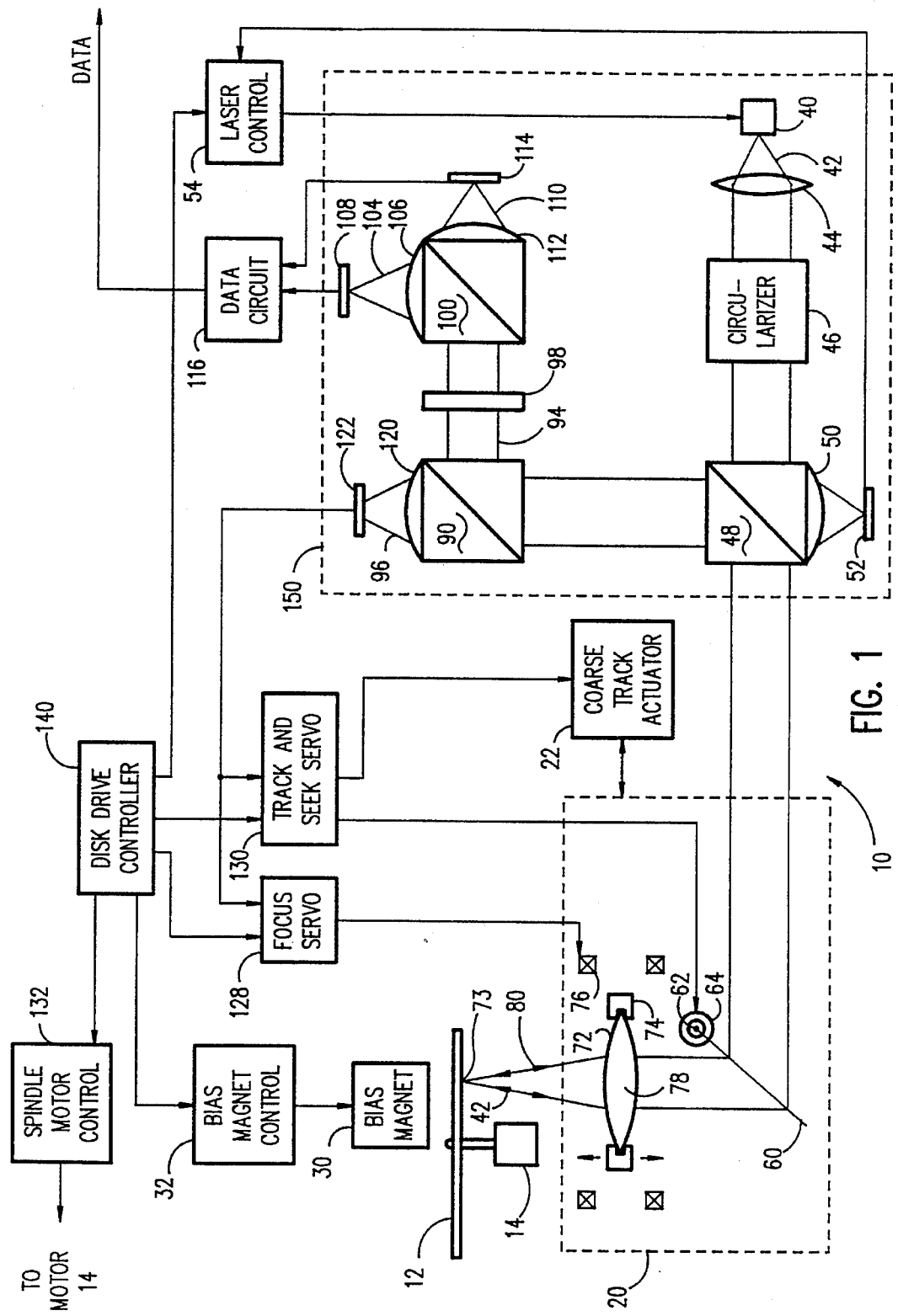
FIG. 1 is a schematic diagram showing an optical data storage system of the present invention.

FIG. 1 is a schematic diagram of an optical data storage system of the present invention and is designated by the general reference number 10. System 10 has an optical data storage medium 12 which is typically a disk having concentric or spiral data tracks. Disk 12 may be contained in an optical data disk cartridge (not shown). Disk 12 is mounted to a spindle motor 14. An optical head 20 is positioned below disk 12. Head 20 is moved in a radial direction relative to disk 12 by a coarse track actuator 22. A bias magnet 30 is located above disk 12 and is connected to a magnet control 32.

A laser 40 produces a polarized light beam 42. Laser 40 may be a laser diode. One example of such a laser diode is a gallium-aluminum-arsenide laser diode which generates light at approximately 780 nanometers in wavelength. Light beam 42 is collimated by a lens 44 and circularized by a circularizer 46. Circularizer 46 is preferably a prism.

Beam 42 passes to a beamsplitter 48. A portion of the beam 42 is reflected toward a lens 50. Lens 50 focuses the light to a power monitor optical detector 52. Detector 52 is connected to a laser control 54. Detector 52 provides laser control 54 with a power monitor signal which is used to adjust the power of laser 40 as appropriate. The remaining portion of beam 42 passes through beamsplitter 48 to a hologram 60. Hologram 60 is preferably a transmissive volume hologram. Hologram 60 is pivotally mounted to head 20 at a pivot axis 62. A rotary actuator 64 is connected to head 20 and hologram 60 and is used to rotate hologram 60 about axis 62. Actuator 64 may be a rotary voice coil motor, piezoelectric motor or any other suitable rotary motor. Hologram 60 diffracts the beam 42 to an objective lens 72. Lens 72 focuses beam 42 to a spot 73 on disk 12. Lens 72 is mounted in a lens holder 74. Holder 74 may be moved up or down relative to disk 12 by a focus actuator voice coil motor 76. A point 78 represents the center aperture of lens 72 when lens 72 is located at the midpoint of the range of movement provided by motor 76.

The rotation of hologram 60 about axis 62 causes spot 73 to be moved slightly in a radial direction along disk 12. This movement is necessary to maintain the position of spot 73 on the desired data track as the disk 12 rotates. This is also known as fine tracking. As will be explained in more detail below, the construction and location of hologram 60 is such that the beam 42 will always pass substantially through the center point 78 of the aperture of lens 72.

The hologram 60, motor 64, lens 72, holder 74 and motor 76 are all located on the optical head 20.

A light beam 80 is reflected from the disk 12, passes through lens 72 and is diffracted by hologram 60. A portion of the light 80 is then reflected by beamsplitter 48 to a beamsplitter 90. Beamsplitter 90 divides the beam 80 into a data beam 94 and a servo beam 96.

Data beam 94 passes through a half wave plate 98 to a polarizing beamsplitter 100. Beamsplitter 100 divides beam 94 into two orthogonal polarization components. A first polarization component beam 104 is focused by a lens 106 to a data optical detector 108. A second polarization component beam 110 is focused by a lens 112 to a data optical detector 114. A data circuit 116 is connected to detectors 108 and 114, and generates a data signal responsive to the differences in the amount of light detected at detectors 108 and 114 which is representative of the data recorded on disk 12.

Servo beam 96 is focussed by lens 120 onto a segmented optical detector 122, such as a spot size measuring detector as is known in the art. A focus servo 128, as is known in the art, is connected to detector 122 and motor 76. Servo 128 controls motor 76 to adjust the position of lens 72 as appropriate in order to maintain proper focus. A track and seek servo 130, as is known in the art, is connected to detector 122 and actuators 22 and 64. Servo 130 causes actuator 22 to adjust the position of head 20 as appropriate to seek desired data tracks on disk 12, and causes actuator 64 to move hologram 60 as appropriate to maintain proper tracking position once the appropriate track is reached. A spindle motor control 132, as is known in the art, is connected to motor 14. A disk drive controller 140, as is known in the art, provides overall control for servo 128 and 130, as well as spindle motor 14, laser control 54 and magnet control 32.

A fixed optical element (FOE) system 150 comprises laser 40, lens 44, circularizer 46, beamsplitter 48, lens 50, detector 52, beamsplitter 90, waveplate 98, beamsplitter 100, lenses 106, 112, 120 and detectors 108, 114 and 122.

The writing and reading operations of system 10 may now be understood. During the write operation, controller 140 causes laser control 54 to energize laser 40 to provide a high power polarized beam 42. Beam 42 is powerful enough to heat spot 73 on disk 12 to a temperature above its Curie temperature. The Curie temperature is the temperature at which the magnetic domain of the heated spot may be magnetically oriented. Controller 140 causes magnetic control 32 to energize magnet 30. The magnetic domains of the heated spots are then oriented in the same direction as the magnetic field generated by the bias magnet. The laser 40 is pulsed responsive to the data to be recorded on the disk. The result is that data is recorded on the disk as spots having an up or down magnetic orientation.

During a read operation, controller 140 causes laser control 54 to energize laser 40 to generate a low power polarized beam 42 which is not powerful enough to heat the disk 12 above its Curie temperature. The reflected light 80 has its plane of polarization rotated one way or the other depending upon the magnetic domain orientations of the spots on the disk 12. This is known as the Kerr effect. These differences in polarization are detected by detectors 108 and 114, and data circuit 116 produces a digitized data signal representative of the recorded data.

Figure 2:
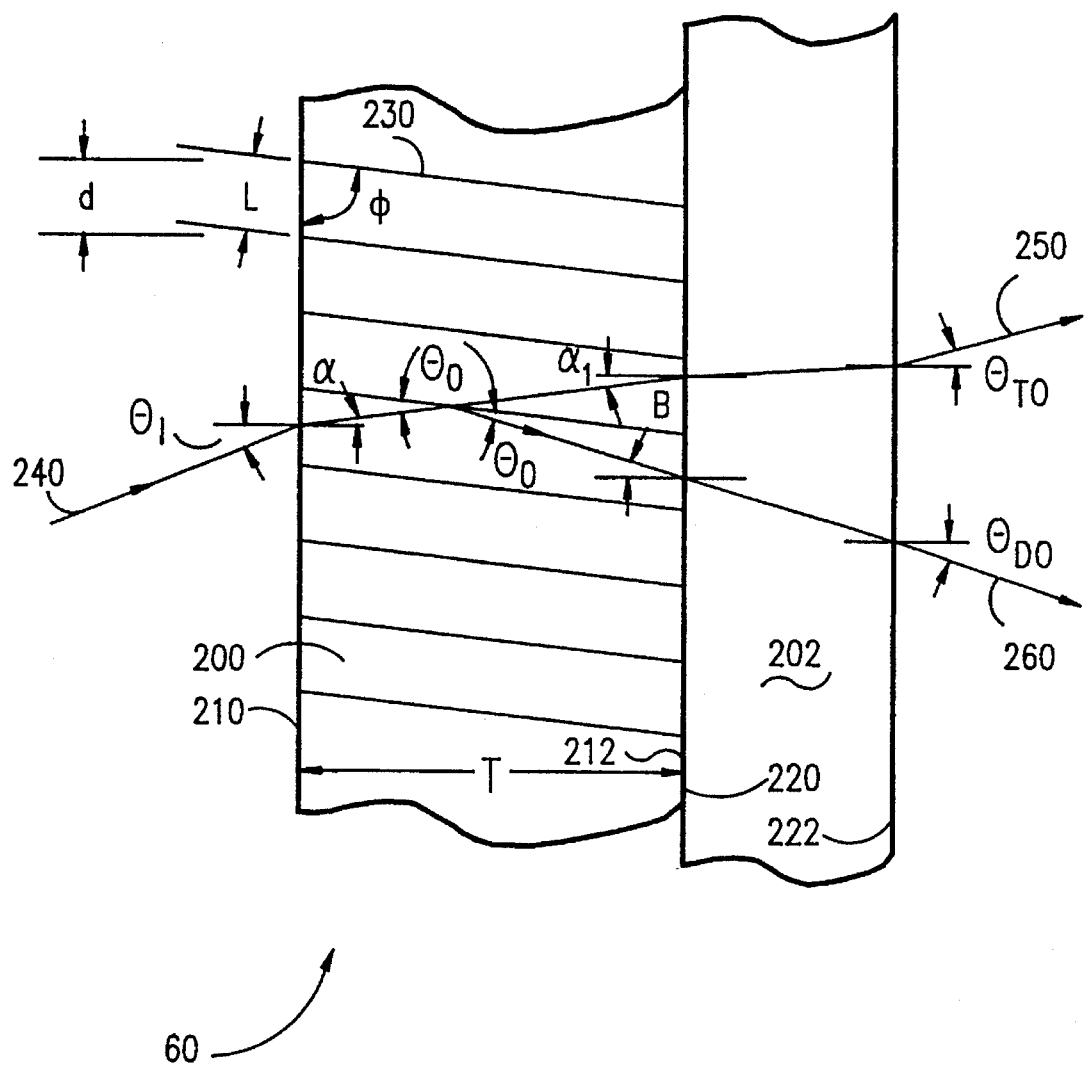
FIG. 2 is a cross sectional view of a hologram of the present invention.

FIG. 2 shows a detailed cross sectional view of hologram 60. Hologram 60 comprises a hologram material 200 deposited to a thickness T on a substrate 202. The hologram material is preferably dichromated gelatin and the substrate is preferably glass. Hologram material 200 has a surface 210 and 212. Substrate 202 has a surface 220 and 222.

The hologram material 200 has been manufactured with periodic Bragg planes 230. The Bragg planes 230 have a separation distance L, an external fringe spacing distance d and an angle φ relative to surface 210.

In operation, an input beam 240 (having a wavelength $\lambda_1$) enters hologram 60 at surface 210 at an angle $\Theta_I$ with respect to the perpendicular. The beam 240 enters the material 200 at an internal incidence angle $\alpha = a\sin(\sin\Theta_I/n_0)$ where $n_0$ is the average index of refraction of material 200 (typically 1.24–1.26). This change in angle is due to refraction. A portion of beam 240 travels through material 200 without experiencing any diffraction and exits substrate 202 as a beam 250. Note that beam 250 experiences refraction at surfaces 212 and 220. This is because material 200 and substrate 202 have different indices of refraction. Beam 250 exits surface 222 at a transmitted output angle of $\Theta_{TO}$. $\Theta_{TO}$ is equal to $\Theta_I$ and beam 250 will appear to be transmitted through hologram 60 without diffraction.

A portion of beam 240 is diffracted by the Bragg planes 230. The angle of beam 240 relative to Bragg plane 230 is $\Theta_0$ and is equal to $a\sin[\lambda_1/2n_0L]$. The diffracted beam encounters surface 212 at an internal diffraction angle β. The diffracted beam exits substrate 202 at surface 222 as a beam 260. Again, there is refraction at surfaces 212 and 220. Beam 260 exits surface 222 at a diffracted output angle of $\Theta_{DO}$. $\Theta_{DO}$ equals $a\sin[n_0\sin\beta]$. The exact properties of beams 250 and 260 are described in more detail below.

In designing the hologram 60, the following variables are taken into account:

$\Theta_I$ = angle of incidence (external).

α = angle of incidence (internal).

β = angle of diffraction (internal).

δ = deviation from the Bragg angle.

φ = tilt of Bragg planes.

= π/2 for no tilt.

L = separation of the Bragg planes.

T = thickness of hologram material.

d = external fringe spacing.

$n_0$ = average refractive index of the hologram medium, typically 1.24–1.26 for an exposed and processed dichromated gelatin holographic grating with high $n_1$.

$n_1$ = Peak change in index of refraction of the hologram medium.

λa = wavelength of light in air. Here λa = $\lambda_1$ = 780 nm.

δλ = deviation from λa (Bragg λ).

These variables are used in the following formulas:

$$\alpha = a\sin\left[\frac{\sin[\Theta_I]}{n_0}\right] \qquad (1)$$

$$\beta = a\sin\left[\frac{\sin(\Theta_{DO})}{n_0}\right] \qquad (2)$$

-continued $$\phi = \frac{\pi}{2} - \frac{\beta - \alpha}{2} \quad (3)$$

$$\theta_0 = \alpha + \frac{\pi}{2} - \phi \quad (4)$$

$$L = \frac{\lambda_a}{2n_0 \sin[\theta_0]} \quad (5)$$

$$d = \frac{L}{\sin(\phi)} \quad (6)$$

$$C_R = \cos(\alpha) \quad (7)$$

$$C_S = \cos(\alpha) - \frac{\lambda_a}{n_0 L} \cos(\phi) \quad (8)$$

$$N = \pi n_1 \frac{T}{\lambda_a \sqrt{C_R C_S}} \quad (9)$$

$$\Gamma = 2\pi\delta \frac{\sin[\phi - \theta_0]}{L} - \delta\lambda \frac{\pi}{n_0 L^2} \quad (10)$$

$$S = \Gamma \frac{T}{2C_s} \quad (11)$$

$$E_s = \frac{[\sin[\sqrt{N^2 + S^2}\,]]^2}{1 + \frac{S^2}{N^2}} \quad (12)$$

$$E_p = \frac{[\sin[\sqrt{N\cos[2\theta_0]]^2 + S^2}\,]]^2}{1 + \frac{S^2}{[N\cos[2\theta_0]]^2}} \quad (13)$$

Formulas 12 and 13 above give the diffraction efficiencies for the S and P orthogonal polarization components and determine the conditions of the beams 250 and 260. Es is the diffraction efficiency of the S polarized light component and Ep is the diffraction efficiency of the P polarized light component. The S and P represent the orthogonal polarization components of the light. A more detailed discussion of hologram mathematics is given by Herwig Kogelnik in "Coupled Wave Theory for Thick Hologram Gratings," Bell System Technical Journal, Vol. 48, No. 9, p 2902 (November 1969).

Formulas 12 and 13 above show that the diffraction efficiencies of the S and P polarized light in beams 250 and 260 may be varied by proper selection of the angles, hologram thickness T and peak change in index of refraction $n_1$.

For hologram 60, it is desired to diffract 100% of the S polarized light as beam 260. In the data storage system 10, beam 42 is an S polarized light beam and there is no P polarized light. Beams 240 and 260, therefore represent the single beam 42 of system 10. There will be little or no beam 250 for system 10.

In the preferred embodiment of hologram 60, $n_0 = 1.25$, $n_1 = 0.25$, $T = 1.26$ microns, $\lambda = 780$ nanometers, $\Theta_I = 58°$, $\Theta_{DO} = 32°$, $\alpha = 42.7°$ and $\beta = 25°$.

Figure 3:
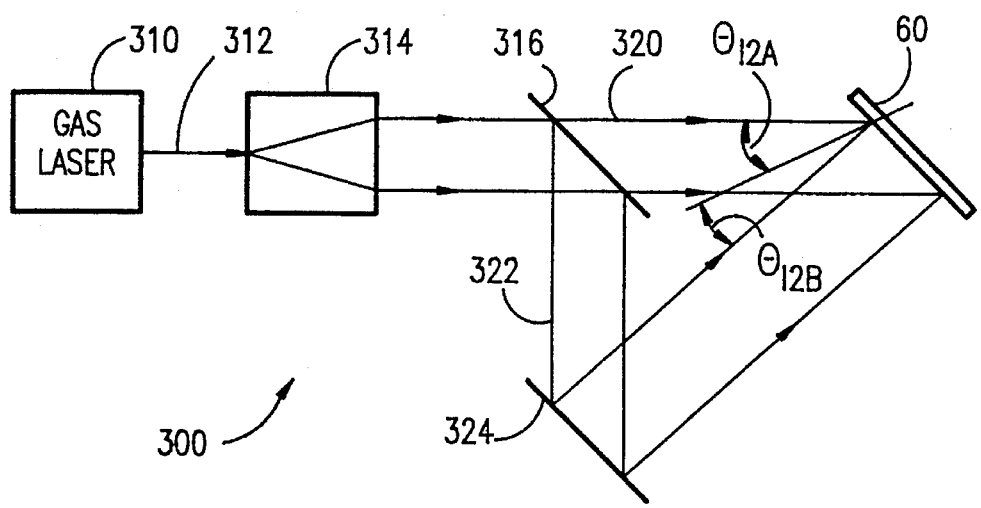
FIG. 3 is a schematic diagram of a system for making the hologram of the present invention.

FIG. 3 shows a schematic diagram of a system for manufacturing the hologram 60 and is designated by the general reference number 300. System 300 has a gas laser 310 which emits a light beam 312 at the recording wavelength $\lambda_2$. Beam 312 is expanded by a beam expander 314. A beamsplitter 316 splits beam 312 into an object beam 320 and an image beam 322. Beam 322 is reflected by a mirror 324 to hologram 60. Beams 320 and 322 intersect at the hologram 60 at recording external incident angles of $\Theta_{I2A}$ and $\Theta_{I2B}$. The angles $\Theta_{I2A}$ and $\Theta_{I2B}$ are determined by the conditions of the desired hologram (L,$\phi$) as was described above. The recording internal angles of incidence are $$\alpha_{2A} = \phi - \pi/2 - \text{asin}[\lambda_2/2n_0 L]$$

$$\alpha_{2B} = \phi - \pi/2 + \text{asin}[\lambda_2/2n_0 L]$$

From Snells Law, $\Theta_{I2A} = \text{asin}[n_0 \sin\alpha_{2A}]$ and $\Theta_{I2B} = \text{asin}[n_0 \sin\alpha_{2B}]$. The hologram material 200 of hologram 60 is thereby exposed to light of $\lambda_2$ at angles $\Theta_{I2A}$ and $\Theta_{I2B}$. The result is that the desired Bragg planes are recorded into the film. It should be noted that in the equations above relating to FIG. 3, $n_0$ is the index of refraction of the unprocessed hologram material and is in the range of 1.51–1.56.

The hologram 60 comprises a substrate 202 with dichromated gelatin material 200 of a thickness T. However, material 200 is initially unexposed and does not contain any Bragg planes 230. The unexposed hologram 60 is placed in the setup of FIG. 3 at the determined angles of orientation. The hologram 60 is then exposed to the beams from laser 310. The amount of exposure time is selected to achieve the desired peak change in index of refraction ($n_1$). The interaction of the beams 320 and 322 in the hologram material 200 and the subsequent processing of the material form the Bragg planes 230. The processing of hologram material is well known in the art. See, for example, Robert J. Collior, et al, *optical Holography*, Academic Press Inc., 1970, chapter 10.

Figure 4:
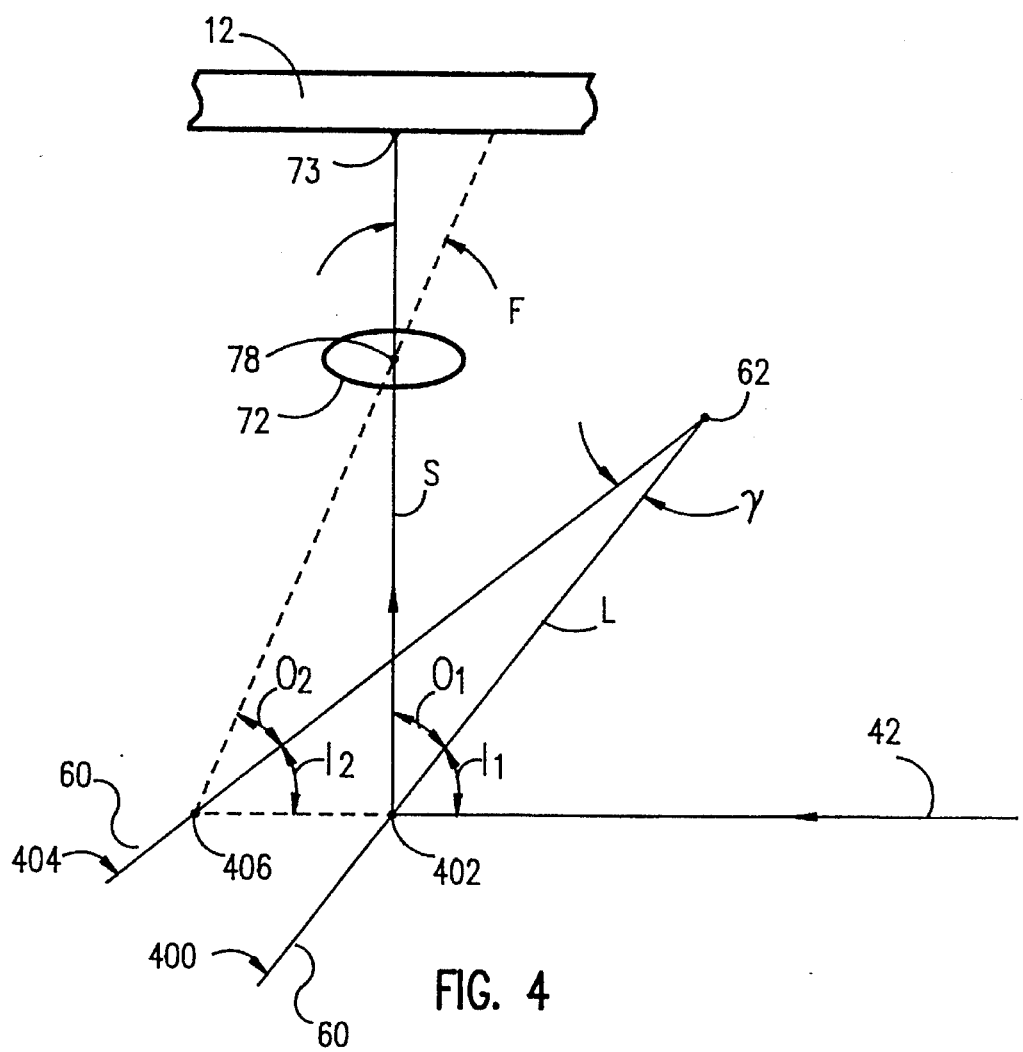
FIG. 4 is a schematic diagram of a portion of the system of FIG. 1.

FIG. 4 shows a schematic diagram of a portion of the system 10 of FIG. 1. The angles and dimensions are exaggerated for purposes of illustration. The centerline of beam 42 is illustrated as a single line. Initially, hologram 60 is in a position 400. The center of beam 42 intersects hologram 60 at a point 402 and at an angle I1, where I1=90°−$\Theta_I$. Beam 42 exits hologram 60 at angle O1, where O1=90°−$\Theta_{DO}$. In other words, at position 400, beam 42 enters hologram 60 at exactly the Bragg angle such that 100% of the beam 42 is diffracted at angle O1. In the preferred embodiment, $\Theta_I$=58°, I1=32°, $\Theta_{DO}$=32°, and O1=58°. The diffracted beam 42 passes through point 78 at the center of lens 72 and is then focused to spot 73 on disk 12.

Next, hologram 60 is rotated pivotally about axis 62 to a position 404. The hologram 60 pivots about an angle $\gamma$. In the preferred embodiment, $\gamma \leq 2.5°$. At position 404, beam 42 intersects hologram 60 at a point 406 and $\Theta_I$=60.5°, I2=29.5°, $\Theta_{DO}$=30.5°, and O2=59.5°. Beam 42 is shown as a dashed line when hologram 60 is at position 404. Beam 42 passes through point 78 of lens 72. However, the beam 42 is rotated from its previous angle at lens 72 by an angle F. In the preferred embodiment, F$\leq$1°. The displacement angle F provides the amount of beam displacement needed for fine tracking on the disk 12.

For positions of hologram 60 between position 400 and 404, beam 42 will also pass through point 78. Point 402 is located a distance L from axis 62 and point 78 is located a distance S from point 402. In a preferred embodiment, the ratio of S/L is substantially equal to 5.0. For example, in a preferred embodiment S may be equal to 1.0 centimeters and L may be equal to 0.2 centimeters. Due to the limited space inside optical head 20 it is desirable to keep the ratio S/L large (in the range of 1–10).

It should be noted that when hologram 60 is at position 404, beam 42 will no longer enter hologram 60 at exactly the Bragg angle. Thus, the diffraction efficiency will not be 100%. However, for slight angular deviations of $\gamma$ ($\leq 2.5°$), the diffraction efficiency will still be very close to 100% and almost all of the light will be diffracted. In a preferred embodiment, when $\gamma$ equals 2.5°, the diffraction efficiency is 99%. In other words, 99% of beam 42 will be diffracted to point 78.

Although the present invention has been illustrated with a preferred design and orientation of hologram 60, many other embodiments are possible. In selecting other designs, the input and output angles and the distances S and L are chosen such that beam 42 will pass through a single point 78 at lens 72. The formulas for holograms given above are then used to design the specific hologram needed to achieve these parameters. Care must be taken in selecting the hologram design such that the angle γ is large enough to give a sufficient displacement angle F which is large enough to provide fine tracking, but γ must not be so large as to allow the diffraction efficiency to fall too low. Also, it is desirable that I1 plus O1 equals approximately 90° so that the horizontal beam 42 from the fixed optical elements 150 is diffracted vertically towards disk 12. This eliminates the need for an additional beam deflecting mirror.

Figure 5:
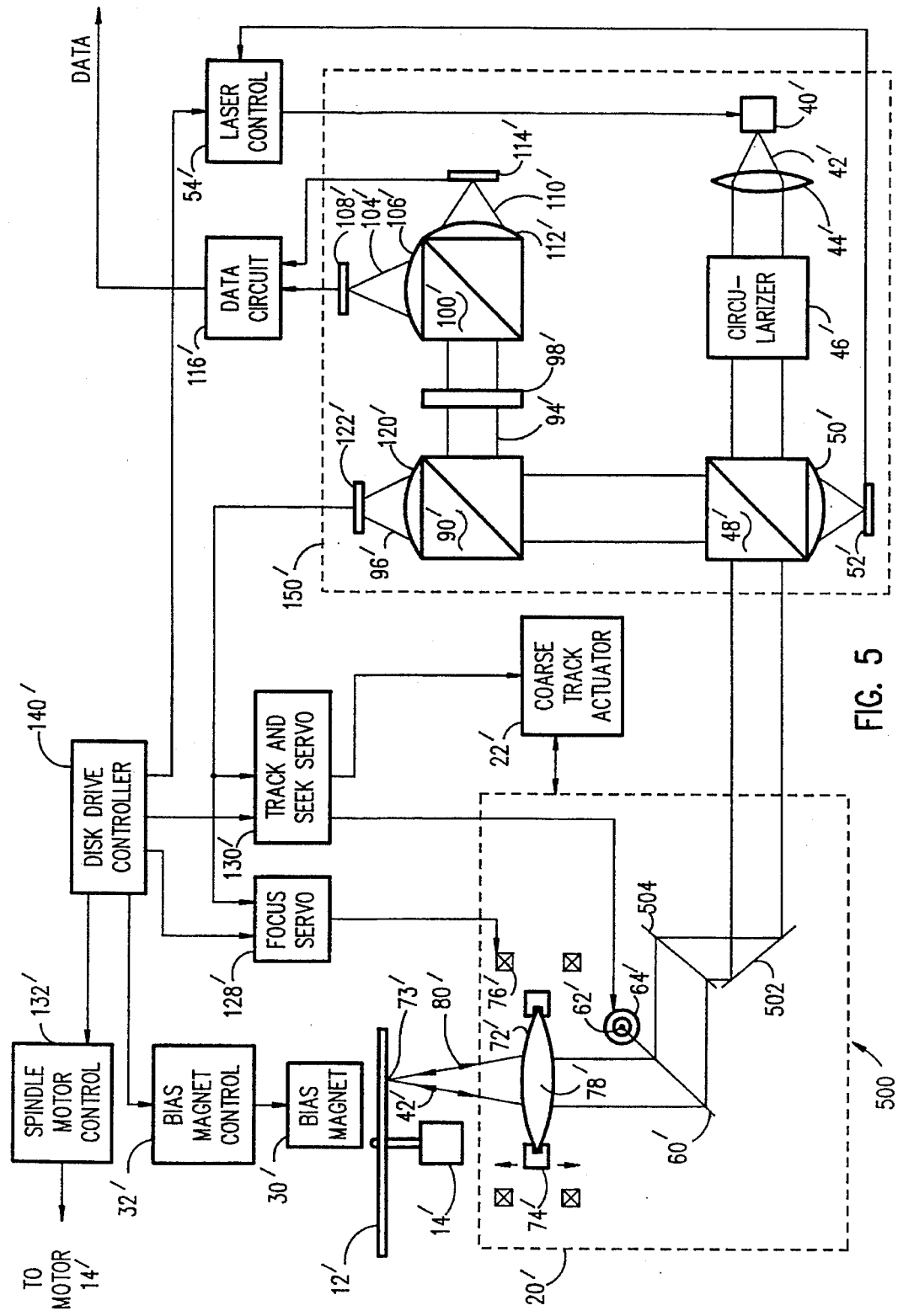
FIG. 5 is a schematic diagram showing an alternative embodiment of the data storage system of the present invention.

FIG. 5 shows a schematic diagram of an alternative embodiment of the system of the present invention and is designated by the general reference number 500. System 500 is used where variation in laser wavelength may occur. Elements of system 500 which are similar to those of system 10 are designated by a prime number.

A deflecting mirror 502 has been added to the head 20 between fixed optical elements 150 and hologram 60'. Finally, a fixed hologram 504 has been added between mirror 502 and hologram 60'. Hologram 504 is the same type of hologram as hologram 60'. In other words, hologram 504 and 60' have the same exact hologram parameters. They may both be formed from a single sheet hologram which is then cut into two pieces.

Hologram 504 is fixed to head 20' such that it is substantially parallel to hologram 60' when hologram 60' is in the position where beam 42 enters it at the Bragg angle (γ=0°). Also, hologram 504 is mounted such that its Bragg planes are oriented in the opposite direction to those of hologram 60'. In other words, even though the holograms are the same, hologram 504 is oriented in the opposite direction to that of hologram 60'. This causes hologram 504 to diffract beam 42 approximately 90° in one direction and then hologram 60' diffracts beam 42 approximately 90° in the other direction. Fine tracking is still achieved by rotating hologram 60' as described with respect to system 10. The distance S is still the distance along the beam path 42 from hologram 60' to point 78'.

The purpose of adding hologram 504 is to cancel out problems which may occur due to wavelength shifts during the operation of laser 40'. Some semiconductor lasers may exhibit significant wavelength shifts during operation and these wavelength shifts may cause the position of spot 73' to wander even when the hologram 60' is not moved. By combining two identical holograms this beam movement due to shifts in wavelength is effectively cancelled out.

Other embodiments of the present invention are also possible. Although the present invention has been illustrated using a magneto-optic media type of optical system, other media systems such as read only memory (ROM), write once read many (WORM), or phase change media, etc., may also be used.

While the preferred embodiments of the present invention have been illustrated in detail, it should be apparent that modification and adaptations to those embodiments may occur to one skilled in the art without departing from the spirit and the scope of the present invention as set forth in the following claims.

I claim:

1. An optical system comprising:

an electromagnetic source for generating an electromagnetic beam;

a pivotally mounted transmissive hologram for receiving the electromagnetic beam at a planar surface and diffracting it, the pivotally mounted hologram having a rotation axis parallel to the planar surface;

a focus device for receiving the electromagnetic beam from the hologram and focussing it to a spot on a target object; and a rotation device connected to the pivotally mounted hologram for rotating the hologram about the rotation axis in order to adjust the position of the beam on the target object, the rotation device rotates the hologram through a predetermined range of angle such that for each position within the range, the center line of the electromagnetic beam passes through the center of the focus device.

2. The system of claim 1, wherein the hologram is a volume hologram.

3. The system of claim 1, wherein the predetermined range of angle is 0° to 2.5°.

4. The system of claim 1, wherein the ratio S/L is in the range of 1.0 to 10.0, where S is equal to the distance from the point where the center line of the electromagnetic beam intersects the hologram to the center point of the focus device, and L is the distance from the point where the center line of the electromagnetic beam intersects the hologram to the rotation axis.

5. The system of claim 4, wherein the ratio S/L is equal to 5.0.

6. The system of claim 1, further comprising a second hologram located between the pivotally mounted hologram and the electromagnetic source.

7. The system of claim 1, wherein the sum of the angle at which the electromagnetic beam enters the hologram and the angle at which the electromagnetic beam leaves the hologram is equal to 90°.

8. An optical data storage system comprising:

a device for receiving an optical data storage disk;

a device for rotating the disk;

an electromagnetic source for generating an electromagnetic beam;

a pivotally mounted transmissive hologram for receiving the electromagnetic beam at a planar surface and diffracting it, the pivotally mounted hologram having a rotation axis parallel to the planar surface;

a focus device for receiving the electromagnetic beam from the hologram and focussing it to a spot on the disk;

a rotation device connected to the pivotally mounted hologram for rotating the hologram about the rotation axis in order to adjust the position of the beam on the disk; and an electromagnetic reception device for receiving a return electromagnetic beam from the disk and generating a data signal responsive thereto.

9. The system of claim 8, wherein the hologram is a volume hologram.

10. The system of claim 8, wherein the rotation device rotates the pivotally mounted hologram through a predetermined range of angle of 0° to 2.5°.

11. The system of claim 8, wherein the ratio S/L is in the range of 1.0 to 10.0, where S is equal to the distance from the point where the center line of the electromagnetic beam intersects the hologram to the center point of the focus device, and L is the distance from the point where the center line of the electromagnetic beam intersects the hologram to the rotation axis.

12. The system of claim 11, wherein the ratio S/L is equal to 5.0.

13. The system of claim 8, further comprising a second hologram located between the pivotally mounted hologram and the electromagnetic source.

14. The system of claim 8, wherein the sum of the angle at which the electromagnetic beam enters the hologram and the angle at which the electromagnetic beam leaves the hologram is equal to 90°.

15. An optical data storage system comprising:

an optical data storage disk;

a device for rotating the optical data storage disk;

a laser for producing an electromagnetic beam;

an optical head for receiving the electromagnetic beam from the laser and positioning the beam at a spot on the disk, the head comprising a pivotally mounted transmissive volume hologram for receiving the electromagnetic beam at an input angle relative to an input planar surface and diffracting it at an output angle relative to an output planar surface, the pivotally mounted hologram having an axis of rotation parallel to the first planar surface, a rotation device connected to the pivotally mounted hologram for rotating the hologram about the rotation axis through a predetermined range of angle, a lens for receiving the electromagnetic beam from the hologram, and a device for moving the lens through a predetermined range of distance;

a linear motor for moving the optical head relative to the disk; and an electromagnetic reception device for receiving a return electromagnetic beam from the disk and generating a data signal responsive thereto.

16. The system of claim 15, wherein, for each position in the predetermined range of angle of the pivotally mounted hologram, the center line of the electromagnetic beam passes through the center of the lens when the lens is located at a center location in its predetermined range of distance.

17. The system of claim 15, further comprising a reflection device and a second hologram located in the optical head along the electromagnetic beam path between the laser and the pivotally mounted hologram.

18. The system of claim 17, wherein the pivotally mounted hologram and the second hologram are of the same type.

19. The system of claim 15, wherein the hologram is comprised of a dichromatic gelatin deposited on a substrate.

20. The system of claim 15, wherein the hologram is a transmissive hologram.

21. The system of claim 15, wherein the predetermined range of angle is 0° to 2.5°.

22. The system of claim 15, wherein the ratio S/L is in the range of 1.0 to 10.0, where S is equal to the distance from the point where the center line of the electromagnetic beam intersects the hologram to the center point of the focus device, and L is the distance from the point where the center line of the electromagnetic beam intersects the hologram to the rotation axis.

23. The system of claim 22, wherein the ratio S/L is equal to 5.0.

24. The system of claim 15, wherein the input angle is equal to the Bragg angle of the hologram.

25. An optical system comprising:

an electromagnetic source for generating an electromagnetic beam;

a pivotally mounted hologram for receiving the electromagnetic beam at a planar surface and diffracting it, the pivotally mounted hologram having a rotation axis parallel to the planar surface;

a focus device for receiving the electromagnetic beam from the hologram and focussing it to a spot on a target object; and a rotation device connected to the pivotally mounted hologram for rotating the hologram about the rotation axis in order to adjust the position of the beam on the target object, the rotation device rotates the hologram through a range of angle of 0° to 2.5° such that for each position within the range, the center line of the electromagnetic beam passes through the center of the focus device.

26. An optical system comprising:

an electromagnetic source for generating an electromagnetic beam;

a pivotally mounted hologram for receiving the electromagnetic beam at a planar surface and diffracting it, the pivotally mounted hologram having a rotation axis parallel to the planar surface;

a focus device for receiving the electromagnetic beam from the hologram and focussing it to a spot on a target object; and a rotation device connected to the pivotally mounted hologram for rotating the hologram about the rotation axis in order to adjust the position of the beam on the target object, wherein the ratio S/L is in the range of 1.0 to 10.0, where S is equal to the distance from the point where the center line of the electromagnetic beam intersects the hologram to the center point of the focus device, and L is the distance from the point where the center line of the electromagnetic beam intersects the hologram to the rotation axis, the rotation device rotates the hologram through a predetermined range of angle such that for each position within the range, the center line of the electromagnetic beam passes through the center of the focus device.

27. The system of claim 26, wherein the ratio S/L is equal to 5.0.

28. An optical data storage system comprising:

a device for receiving an optical data storage disk;

a device for rotating the disk;

an electromagnetic source for generating an electromagnetic beam;

a pivotally mounted hologram for receiving the electromagnetic beam at a planar surface and diffracting it, the pivotally mounted hologram having a rotation axis parallel to the planar surface;

a focus device for receiving the electromagnetic beam from the hologram and focussing it to a spot on the disk;

a rotation device connected to the pivotally mounted hologram for rotating the hologram about the rotation axis in order to adjust the position of the beam on the disk, wherein the rotation device rotates the pivotally mounted hologram through a predetermined range of angle of 0° to 2.5°; and an electromagnetic reception device for receiving a return electromagnetic beam from the disk and generating a data signal responsive thereto.

29. An optical data storage system comprising:

a device for receiving an optical data storage disk;

a device for rotating the disk;

an electromagnetic source for generating an electromagnetic beam;

a pivotally mounted hologram for receiving the electromagnetic beam at a planar surface and diffracting it, the pivotally mounted hologram having a rotation axis parallel to the planar surface;

a focus device for receiving the electromagnetic beam from the hologram and focussing it to a spot on the disk;

a rotation device connected to the pivotally mounted hologram for rotating the hologram about the rotation axis in order to adjust the position of the beam on the disk, wherein the ratio S/L is in the range of 1.0 to 10.0, where S is equal to the distance from the point where the center line of the electromagnetic beam intersects the hologram to the center point of the focus device, and L is the distance from the point where the center line of the electromagnetic beam intersects the hologram to the rotation axis; and an electromagnetic reception device for receiving a return electromagnetic beam from the disk and generating a data signal responsive thereto.

30. The system of claim 29, wherein the ratio S/L is equal to 5.0.

31. An optical data storage system comprising:

an optical data storage disk;

a device for rotating the optical data storage disk;

a laser for producing an electromagnetic beam;

an optical head for receiving the electromagnetic beam from the laser and positioning the beam at a spot on the disk, the head comprising a pivotally mounted volume hologram for receiving the electromagnetic beam at an input angle relative to an input planar surface and diffracting it at an output angle relative to an output planar surface, the pivotally mounted hologram having an axis of rotation parallel to the first planar surface, a rotation device connected to the pivotally mounted hologram for rotating the hologram about the rotation axis through a range of angle of 0° to 2.5°, a lens for receiving the electromagnetic beam from the hologram, and a device for moving the lens through a predetermined range of distance;

a linear motor for moving the optical head relative to the disk; and an electromagnetic reception device for receiving a return electromagnetic beam from the disk and generating a data signal responsive thereto.

32. An optical data storage system comprising:

an optical data storage disk;

a device for rotating the optical data storage disk;

a laser for producing an electromagnetic beam;

an optical head for receiving the electromagnetic beam from the laser and positioning the beam at a spot on the disk, the head comprising a pivotally mounted volume hologram for receiving the electromagnetic beam at an input angle relative to an input planar surface and diffracting it at an output angle relative to an output planar surface, the pivotally mounted hologram having an axis of rotation parallel to the first planar surface, a rotation device connected to the pivotally mounted hologram for rotating the hologram about the rotation axis through a predetermined range of angle, wherein the ratio S/L is in the range of 1.0 to 10.0, where S is equal to the distance from the point where the center line of the electromagnetic beam intersects the hologram to the center point of the focus device, and L is the distance from the point where the center line of the electromagnetic beam intersects the hologram to the rotation axis, a lens for receiving the electromagnetic beam from the hologram, and a device for moving the lens through a predetermined range of distance;

a linear motor for moving the optical head relative to the disk; and an electromagnetic reception device for receiving a return electromagnetic beam from the disk and generating a data signal responsive thereto.

33. The system of claim 32, wherein the ratio S/L is equal to 5.0.

* * * * *

UNITED STATES PATENT AND TRADEMARK OFFICE
CERTIFICATE OF CORRECTION

PATENT NO. : 5,526,144
DATED : June 11, 1996
INVENTOR(S) : Dickson et al.

It is certified that error appears in the above-indentified patent and that said Letters Patent is hereby corrected as shown below:

Column 9, claim 20, delete "whole claim", insert--

20. The system of claim 15, wherein the sum of the input angle and the output angle is equal to 90°.--.

Signed and Sealed this

Twenty-second Day of October, 1996

Attest:

BRUCE LEHMAN

*Attesting Officer*  *Commissioner of Patents and Trademarks*